(12) United States Patent
Liu et al.

(10) Patent No.: US 10,279,440 B2
(45) Date of Patent: May 7, 2019

(54) PRECISION FORMING METHOD OF HIGH-EFFICIENCY AND NEAR-NET HOLLOW VALVE BLANK OF ENGINE

(71) Applicant: HUAIJI DENGYUN AUTO-PARTS (HOLDING) CO., LTD, Zhaoqing (CN)

(72) Inventors: Jinping Liu, Zhaoqing (CN); Hongchao Ji, Zhaoqing (CN); Zhenghuan Hu, Zhaoqing (CN); Baoyu Wang, Zhaoqing (CN); Tao Zhang, Zhaoqing (CN); Dongqiang Mo, Zhaoqing (CN); Huahuan Luo, Zhaoqing (CN); Ge Sun, Zhaoqing (CN); Zhengrong Zhang, Zhaoqing (CN); Wanqi Qiu, Zhaoqing (CN)

(73) Assignee: HUAIJI DENGYUN AUTO-PARTS (HOLDING) CO., LTD. (CN)

( * ) Notice: Subject to any disclaimer, the term of this patent is extended or adjusted under 35 U.S.C. 154(b) by 0 days.

(21) Appl. No.: 15/309,487

(22) PCT Filed: May 11, 2015

(86) PCT No.: PCT/CN2015/078674
§ 371 (c)(1),
(2) Date: Nov. 8, 2016

(87) PCT Pub. No.: WO2016/179780
PCT Pub. Date: Nov. 17, 2016

(65) Prior Publication Data
US 2018/0104776 A1     Apr. 19, 2018

(51) Int. Cl.
*B23P 15/00*   (2006.01)
*B21J 5/08*    (2006.01)
(Continued)

(52) U.S. Cl.
CPC .............. *B23P 15/002* (2013.01); *B21H 1/18* (2013.01); *B21J 5/08* (2013.01); *B21K 1/22* (2013.01);
(Continued)

(58) Field of Classification Search
CPC ..... B21H 1/18; B21J 5/08; B21K 1/20; B21K 1/22; B23P 15/002; F01L 3/14;
(Continued)

(56) References Cited

U.S. PATENT DOCUMENTS 2,452,628 A * 11/1948 Bartlett ................. B21C 23/183
                                                  123/188.3
2,452,636 A * 11/1948 Cunningham ........ B23P 15/002
                                                   29/888.452
(Continued)

FOREIGN PATENT DOCUMENTS

| CN | 101786132 A | 7/2010 |
| CN | 101856706 A | 10/2010 |
| EP | 2440808 A1 | 4/2012 |

*Primary Examiner* — Sarang Afzali
(74) *Attorney, Agent, or Firm* — Schmeiser, Olsen & Watts, LLP

(57) ABSTRACT

A precision forming method of a high-efficiency and near-net hollow valve blank of an engine is provided, wherein the precision performing is realized by the cross wedge rolling mold, under the rolling the metal tubing for the valve deforms, with a middle part sunken and two ends elongating, the middle part forms a stem part of a hollow valve, the two ends form disk parts to be machined, and the connection sections between the disk parts and the stem part form neck parts having arced concave faces and a frustoconical lateral face in structure, achieving better consistency among the acquired hollow valve blanks. The disk part of each acquired hollow valve preformed blank is machined by the die-forging forming mold that is matched with the disk structure of the manufactured hollow valve, the hollow valve pre-
(Continued)

formed blank is directly placed in the cavities of the die-forging forming mold for forging.

9 Claims, 5 Drawing Sheets

(51) Int. Cl.
    *F01L 3/20*     (2006.01)
    *B21H 1/18*     (2006.01)
    *B21K 1/22*     (2006.01)
    *F01L 3/14*     (2006.01)

(52) U.S. Cl.
    CPC ............... *F01L 3/14* (2013.01); *F01L 3/20* (2013.01); *F01L 2103/01* (2013.01); *Y10T 29/49298* (2015.01)

(58) Field of Classification Search
    CPC ..... F01L 3/20; F01L 2103/01; Y10T 29/4925; Y10T 29/49298–29/49314
    See application file for complete search history.

(56) References Cited

U.S. PATENT DOCUMENTS

| | | | | |
|---|---|---|---|---|
| 3,793,873 | A | * | 2/1974 | Iwata .................... B21J 9/08 29/888.451 |
| 4,065,948 | A | * | 1/1978 | Tsukamoto ............ B21H 1/18 72/108 |
| 4,813,126 | A | | 3/1989 | Williamson |
| 5,056,219 | A | * | 10/1991 | Iwase ..................... B21K 1/22 123/188.3 |
| 2014/0352385 | A1 | * | 12/2014 | Noguchi ................. B21K 1/22 72/256 |
| 2014/0366373 | A1 | * | 12/2014 | Morii ..................... F01L 3/14 29/888.451 |

* cited by examiner

PRECISION FORMING METHOD OF HIGH-EFFICIENCY AND NEAR-NET HOLLOW VALVE BLANK OF ENGINE

CROSS-REFERENCE TO RELATED APPLICATIONS

This application claims priority to PCT Application No. PCT/CN2015/078674, having a filing date of May 11, 2015, based off of Chinese Application No. 201510237479.5 having a filing date of May 11, 2015, the entire contents of which are hereby incorporated by reference.

FIELD OF TECHNOLOGY

The following relates to the technical field of the plastic forming of metal, and in particular to a precision forming method of a high-efficiency and near-net hollow valve blank of an engine.

BACKGROUND

A valve is a key component of a valve mechanism of an engine, and the opening and closing of the valve allow combustible gas to enter a cylinder and waste gas to be exhaled. A hollow valve is lightweight, and the thermal conductivity is effectively improved due to the function of a certain volume of metal sodium sealed in a hollow part of the hollow valve. In the working process of the engine, valve disk parts and a valve seat strike each other frequently and undergo erosion from the high-temperature and high-pressure combustion gas, particularly, a heavy load being applied to valve neck parts. Therefore, the valve must not only have a higher mechanical performance but also requires the internal metal streamline direction to be consistent with its appearance with a fine metallographic structure and a certain fatigue strength.

A hollow valve production method commonly used in China is a solid valve drilling method, which can only be used to get a hollow valve with a hollow stem part but solid disk parts. In addition, the production efficiency and the material utilization rate are low, and waste is caused particularly for the hollow valve formed from a group of revolving bodies with different shapes and sizes.

SUMMARY

An aspect relates to a precision forming method of a high-efficiency and near-net hollow valve blank of an engine, where a cross wedge rolling mold and a die-forging forming mold are used to perform successively the rolling and forging on a heated metal tubing, thereby shaping the metal tubing into a hollow valve with no need to hollow the valve by drilling, thereby avoiding material waste and effectively improving the production efficiency and the material utilization rate.

A precision forming method of a high-efficiency and near-net hollow valve blank of an engine includes the following steps:

Step 1: manufacturing a cross wedge rolling mold and a die-forging forming mold;

Step 2: heating a metal tubing for a valve to a rolling temperature;

Step 3: rolling the metal tubing for the valve that is heated to the rolling temperature by the cross wedge rolling mold to make the metal tubing for the valve change in outside diameter and elongate along an axial direction thereof to form a eudipleural hollow valve blank, where a symmetric line for the eudipleural hollow valve blank is vertical to an axis thereof, and the hollow valve blank has a middle part as a stem part and two ends as disk parts, and connection sections between the stem part and the disk parts as neck parts of the hollow valve blank;

Step 4: segmenting the hollow valve blank along the symmetric line of the hollow valve blank to form a first hollow valve preformed blank and a second hollow valve preformed blank, both of which are the same in structure, where each hollow valve preformed blank consists of a stem part, a neck part and a disk part, all of which are continuously connected in sequence;

Step 5: forging the first hollow valve preformed blank or the second hollow valve preformed blank by the die-forging forming mold to shape the disk part of the first or second hollow valve preformed blank into the disk part of the hollow valve, thereby manufacturing the hollow valve.

In embodiments of the present invention, the die-forging forming mold includes a mold body and an impacting and pressing component, both of which are disposed separately. The mold body is internally provided with an impacting inner cavity, a hollow valve disk part forming inner cavity, a hollow valve neck part forming inner cavity and a hollow valve stem part placing inner cavity, all of which are disposed on top of one another and communicated continuously and are collinear in axis; the hollow valve disk part forming inner cavity consists of a disk excircle forming cavity, a disk conical face forming cavity and a disk concave face forming cavity, all of which are disposed on top of one another and are continuous, wherein the disk excircle forming cavity is used for forming a disk excircle of the disk part of the hollow valve, the disk conical face forming cavity is used for forming a disk conical face of the disk part of the hollow valve, and the disk concave face forming cavity is used for forming an arced concave face of the disk part of the hollow valve; an outline of the hollow valve neck part forming inner cavity is consistent with an external outline of the neck part of the hollow valve blank; and an outline of the hollow valve stem part placing inner cavity is consistent with an external outline of the stem part of the hollow valve blank. A top end face of the impacting and pressing component is a stamping bearing plane for bearing an external stamping force, the middle of a bottom end face of the impacting and pressing component is provided with a forging member capable of stretching into an inner cavity of each hollow valve preformed blank and applying the stamping force to the disk part of the hollow valve preformed blank; and an outer peripheral face of the forging member is formed by combining a frustoconical lateral face, an arced concave face and a cylindrical face, all of which are disposed on top of one another and are collinear in axis and continuous.

In embodiments of the present invention, in Step 3, the outer peripheral face of the neck part of the hollow valve blank is formed by mutually connecting the continuous frustoconical lateral face and the arced concave face.

A relation between a radius R1 of the arced concave face of the neck part of each hollow valve preformed blank and a radius R0 of a cavity face of the disk part concave face forming cavity in the die-forging forming mold meets $R1=1.05 \times R0$; and a relation between a radius R2 of an arced concave face of the disk part of a manufactured hollow valve and a radius R0 of a cavity of the disk part concave face forming cavity in the die-forging forming mold mets $R2=R0$.

The cross wedge rolling mold includes a wedging part, a spreading part and a finishing part. As a further improvement to the present invention, the cross wedge rolling mold has a forming angle of 35° to 38°, a spreading angle of 4° to 6° of the welding part, and a spreading angle of 3° to 5° of the spreading part.

As a further improvement to the present invention, in Step 3, the cross wedge rolling mold rolls the metal tubing for the valve that is heated to the rolling temperature under a disengagement condition.

In embodiments of the present invention, in Step 5, the forging is implemented by using the residual rolling heat of the first or second hollow valve preformed blank; or before the forging, the first or second hollow valve preformed blank is heated.

In embodiments of the present invention, in Step 1, the corresponding cross wedge rolling mold and die-forging forming mold are manufactured according to the specifications of the hollow valve to be manufactured as required.

In embodiments of the present invention, in Step 2, a heating furnace is used to heat the metal tubing for the valve, with the metal tubing for valve being the steel tubing; and in Step 3, the cross wedge rolling mold is installed in a cross wedge rolling machine, and a material pushing device is used to push the metal tubing for the valve heated to the rolling temperature into the cross wedge rolling machine, thereby implementing the rolling of the metal tubing for the valve heated to the rolling temperature by the cross wedge rolling mode.

As a further improvement to the present invention, the rolling temperature is 1000° C. to 1200° C.

In the technical solution as described above, a cross wedge rolling technology is used in the precision forming method of the high-efficiency and near-net hollow valve blank of the engine to produce the valve blanks for automobile engines. Compared with the traditional electric hot-upsetting process, embodiments of the present invention have the following advantages.

(1) The precision performing is realized by the cross wedge rolling mold, under the rolling of which the metal tubing for the valve deforms, with a middle part sunken and two ends elongating. The middle part forms the stem part of the hollow valve; the two ends form the disk parts to be machined; and the connection sections between the disk parts and the stem part form the neck parts (the outer peripheral face consisting of the arced concave face and the frustoconical lateral face), thereby meeting the manufacturing requirements at the cross wedge rolling phase of the metal tubing for the valve, achieving better consistency among the acquired hollow valve blanks in terms of shape and size, avoiding such a situation that the revolving face of the stem part is obtained by the subsequent rough machining manner, and effectively improving the production efficiency and the material utilization rate;

(2) After the rolling is completed, the disk part of each acquired hollow valve preformed blank is machined by the die-forging forming mold that is matched with the disk structure of the manufactured hollow valve, and the hollow valve preformed blank is directly placed in the cavities of the die-forging forming mold for forging, so that the manufactured hollow valve is reasonable in the overall streamline distribution of the stem part, the neck part and the disk part. The hollow valve is dense in structure, and meets the performance requirements; and (3) With the metal tubing for the valve serving as the blank to perform the rolling and forging, there is no need to hollow the valve in a drilling manner, thereby effectively preventing material waste, and achieving the advantages of low rejection rate, high material-saving rate, high forming precision, high production rate and the like.

BRIEF DESCRIPTION

Some of the embodiments will be described in detail, with reference to the following figures, wherein like designations denote like members, wherein.

Figure 1:
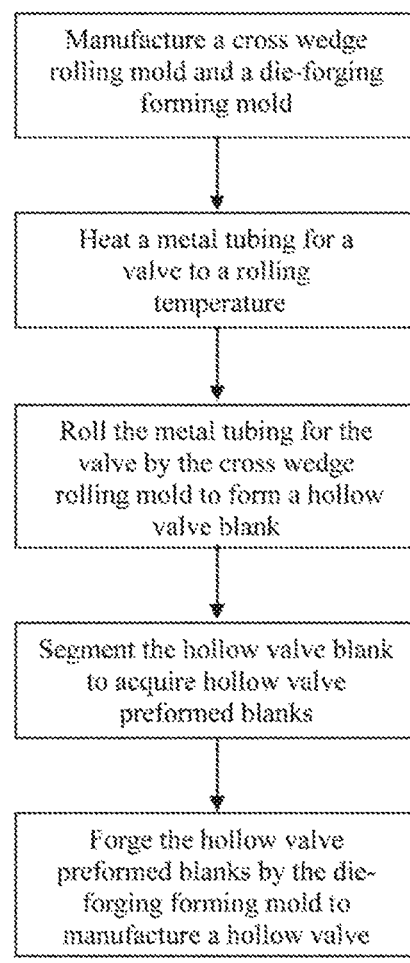
FIG. 1 is a simplified flowchart of the steps of a method in accordance with embodiments of the present invention.
Figure 2:
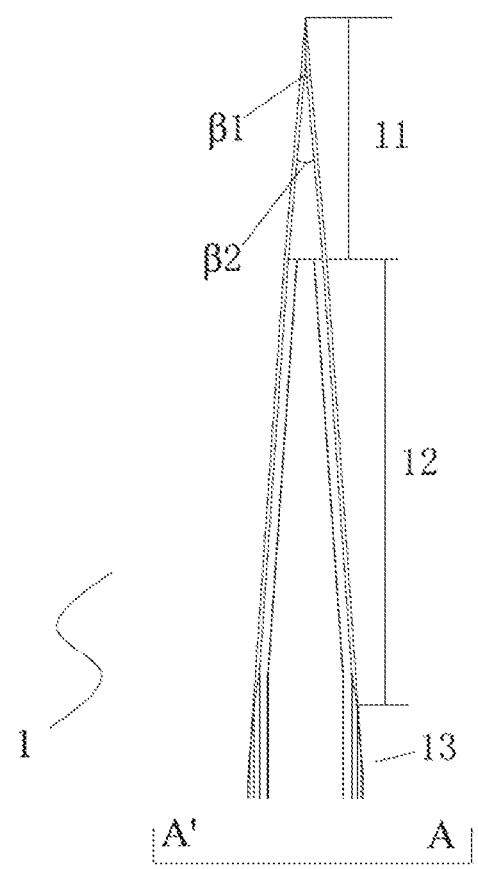
FIG. 2 is a simplified diagram of a cross wedge rolling mold in accordance with embodiments of the present invention.
Figure 3:
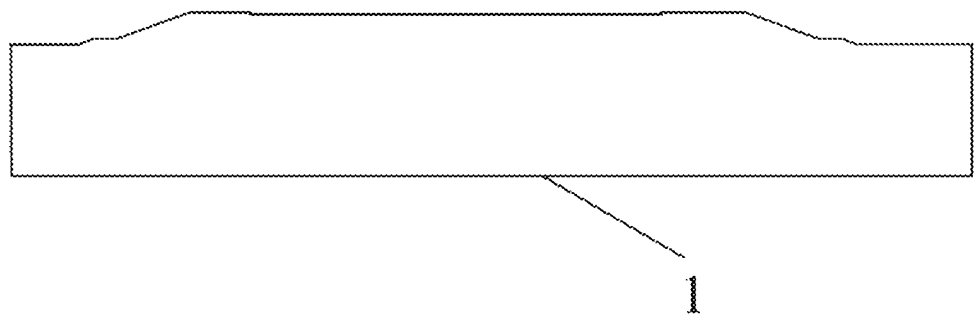
FIG. 3 is a structural schematic diagram of an A'-A direction in FIG. 2.
Figure 4:
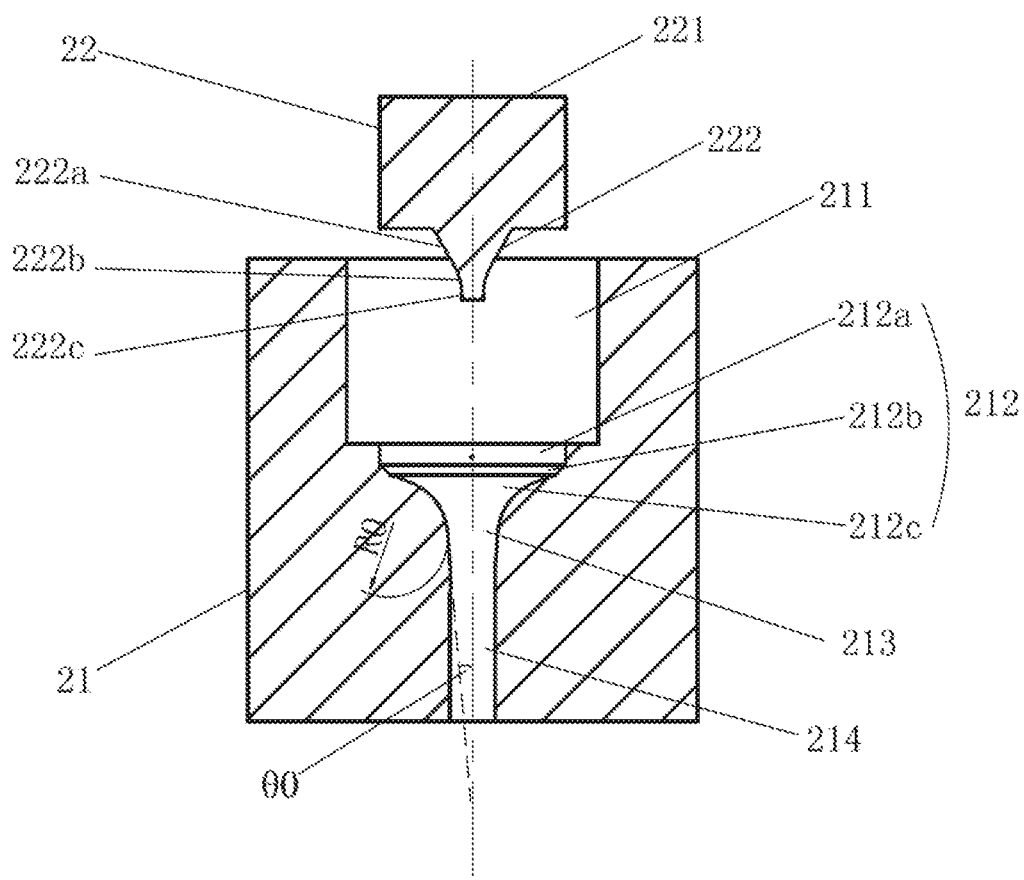
FIG. 4 is a structural schematic diagram of a die-forging forming mold in accordance with embodiments of the present invention.
Figure 5:
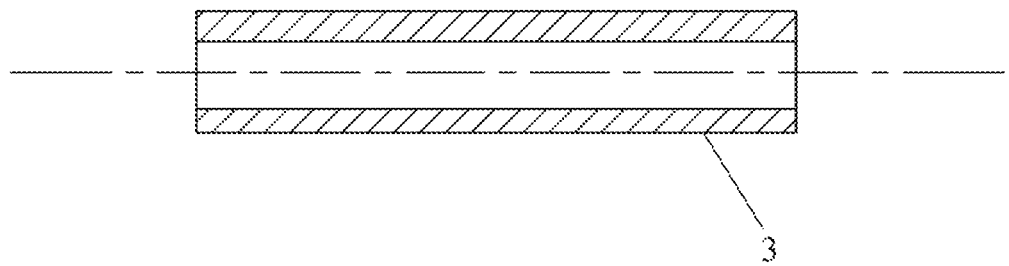
FIG. 5 is a structural schematic diagram of a metal tubing for a valve in accordance with embodiments of the present invention.
Figure 6:
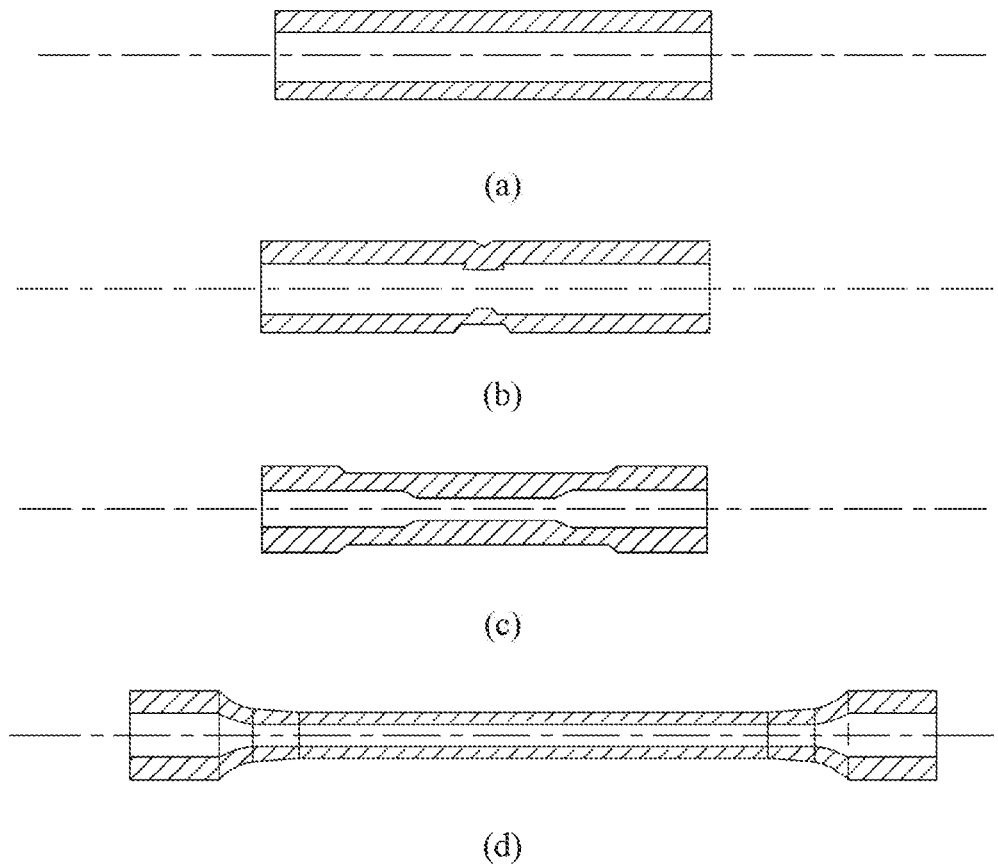
Figure 7:
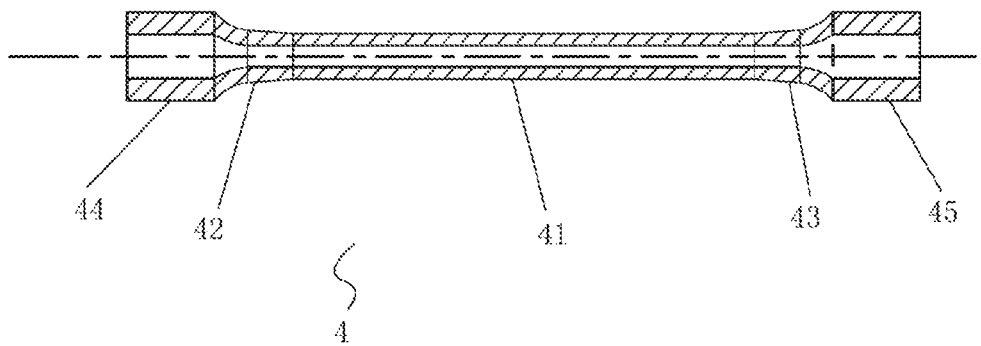
Figure 8:
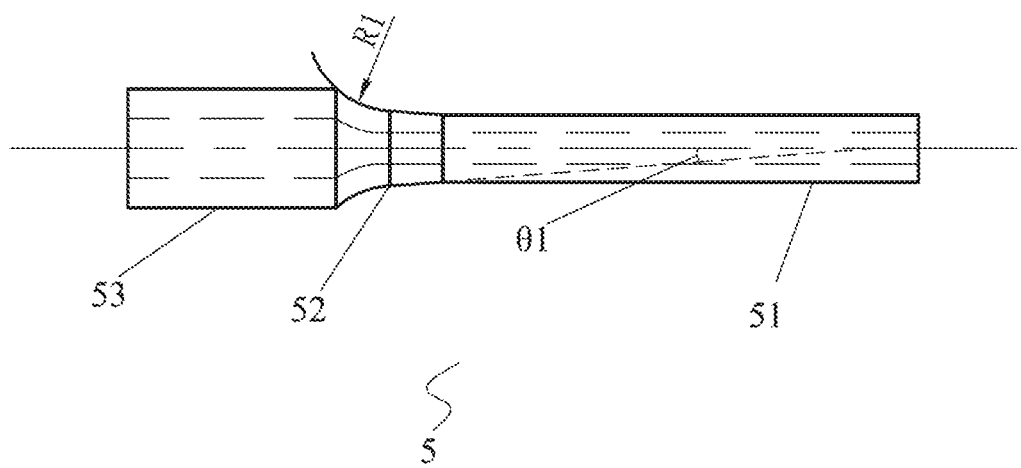
Figure 9:
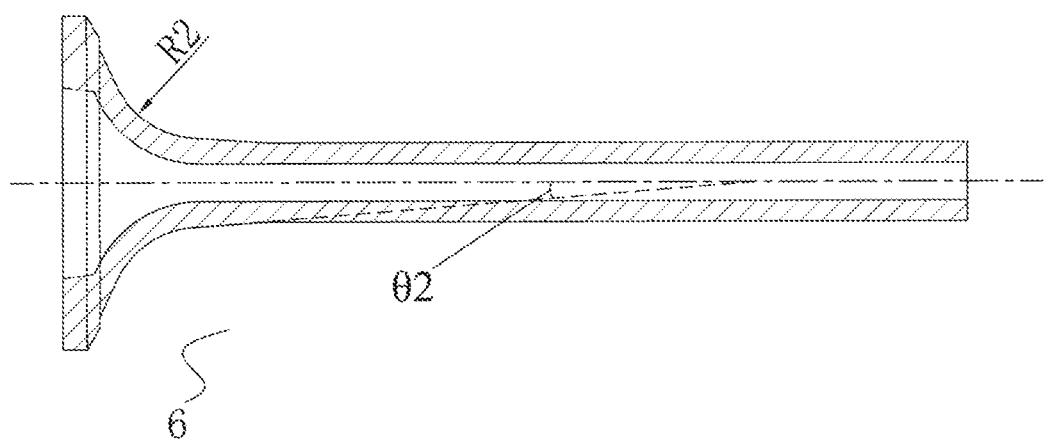

FIG. 6 is a schematic diagram of a process of rolling a metal tubing for a valve by a cross wedge rolling mold, wherein (a) is a structural schematic diagram of the metal tubing for the valve at a wedging section of the cross wedge rolling mold, (b) is a structural schematic diagram of the metal tubing for the valve at a wedging and flattening section of the cross wedge rolling mold, (c) is a structural schematic diagram of the metal tubing for the valve at a spreading section of the cross wedge rolling mold, and (d) is a structural schematic diagram of a hollow valve blank that is formed from the metal tubing for the valve at a finishing section of the cross wedge rolling mold;

FIG. 7 is a structural schematic diagram of a hollow valve blank formed through rolling in accordance with embodiments of the present invention;

FIG. 8 is a structural schematic diagram of one of hollow valve preformed blanks formed after segmenting the hollow valve blank in accordance with embodiments of the present invention; and FIG. 9 is a structural schematic diagram of a hollow valve manufactured in accordance with embodiments of the present invention.

DETAILED DESCRIPTION

Referring to FIGS. 1 to 9, the precision forming method of a high-efficiency and near-net hollow valve blank of an engine of embodiments of the present invention includes the following steps.

Step 1: manufacture a cross wedge rolling mold 1 and a die-forging forming mold 2.

In the present embodiment, the methods for manufacturing the cross wedge rolling mold 1 and the die-forging forming mold 2 are the same as those in the prior art, and thus the detailed description thereof will be omitted here. Specifically, in Step 1, the corresponding cross wedge rolling mold 1 and die-forging forming mold 2 are manufactured according to the specifications of the hollow valve to be manufactured as required; that is, a drawing of the hollow valve to be manufactured is well designed in advance, and then, the corresponding cross wedge rolling mold 1 and die-forging forming mold 2 are manufactured according to the well-designed drawing of the hollow valve.

Specifically, the cross wedge rolling mold 1 includes a wedging part 11, a spreading part 12 and a finishing part 13.

As a further improvement to the present invention, the cross wedge rolling mold 1 has a forming angle of 35° to 38°, and a spreading angle of 4° to 6° of the welding part, and a spreading angle of 3° to 5° of the spreading part.

Specifically, the die-forging forming mold 2 includes a mold body 21 and an impacting and pressing component 22, both of which are disposed separately.

The mold body 21 is internally provided with an impacting inner cavity 211, a hollow valve disk part forming inner cavity 212, a hollow valve neck part forming inner cavity 213 and a hollow valve stem part placing inner cavity 214, all of which are disposed on top of one another and communicated continuously and are collinear in axis; the hollow valve disk part forming inner cavity 212 consists of a disk excircle forming cavity 212a, a disk conical face forming cavity 212b and a disk concave face forming cavity 212c, all of which are disposed on top of one another and are continuous; the disk excircle forming cavity 212a is used for forming a disk excircle of the disk part of the hollow valve; the disk conical face forming cavity 212b is used for forming a disk conical face of the disk part of the hollow valve; and the disk concave face forming cavity 212c is used for forming an arced concave face of the disk part of the hollow valve.

The top end face of the impacting and pressing component 22 is a stamping bearing plane 221 for bearing an external stamping force; the middle of a bottom end face of the impacting and pressing component 22 is provided with a forging member 222 capable of stretching into an inner cavity of each hollow valve preformed blank and applying the stamping force to the disk part of the hollow valve preformed blank; and an outer peripheral face of the forging member 222 is formed by combining a frustoconical lateral face 222a, an arced concave face 222b and a cylindrical face 222c, all of which are disposed on top of one another and are collinear in axis and continuous.

Step 2: heat a metal tubing for the valve to a rolling temperature, which is preferably 1000° C. to 1200° C.

Specifically, in Step 2, the heating of the metal tubing 3 of the valve is implemented by a heating furnace; and in the present embodiment, the metal tubing for the valve 3 is a steel tubing.

Step 3: roll the metal tubing for the valve 3 that is heated to the rolling temperature by the cross wedge rolling mold 1 to make the metal tubing for the valve 3 change in outside diameter and elongate along an axial direction thereof to form a eudipleural hollow valve blank 4, where a symmetric line for the lateral symmetry of the hollow valve blank 4 is vertical to an axis of the same, and the hollow valve blank 4 has a middle part as a stem part 41, two ends as disk parts (44 and 45), and connection sections between the stem part 41 and the disk parts (44 and 45) as neck parts (42 and 43) thereof.

Specifically, in Step 3, the cross wedge rolling mold 1 is installed in a cross wedge rolling machine. A material pushing device is used to push the metal tubing for the valve 3 heated to the rolling temperature into the cross wedge rolling machine material pushing device, thereby implementing the rolling to the metal tubing for the valve 3 that is heated to the rolling temperature by the cross wedge rolling mold 1.

In Step 3, the outer peripheral faces of the neck parts of the hollow valve blank 4 are formed by mutually connecting continuous frustoconical lateral faces and continuous arced concave faces. As a preferred technical solution, in Step 3, the cross wedge rolling mold 1 rolls the metal tubing for the valve 3 that is heated to the rolling temperature under a disengagement condition.

Further, an outline of the hollow valve neck part forming inner cavity 213 is consistent with external outline of the neck parts of the hollow valve blank 4; and an outline of the hollow valve stem part placing inner cavity 214 is consistent with an external outline of the stem part of the hollow valve blank 4.

Step 4: segment the hollow valve blank 4 along the symmetric line of the hollow valve blank 4 to form a first hollow valve preformed blank and a second hollow valve preformed blank, both of which are the same in structure, where each hollow valve preformed blank 5 consists of a stem part 51, a neck part 52 and a disk part 53, all of which are continuously connected in sequence.

Step 5: forge the first hollow valve preformed blank or the second hollow valve preformed blank by the die-forging forming mold 2 to shape the disk part of the first or second hollow valve preformed blank into a disk part of the hollow valve, thereby completing the manufacturing of the hollow valve 6.

Further, in Step 5, the forging is implemented by using the residual rolling heat of the first or second hollow valve preformed blank. Or before the forging, the first or second hollow valve preformed blank is heated.

Specifically, in Step 5, one of the hollow valve preformed blanks is placed in the hollow valve disk part forming inner cavity 212, the hollow valve neck part forming inner cavity 213 and the hollow valve stem part placing inner cavity 214 of the die-forging forming mold 2; then, the impacting and pressing component 22 is used to impact and press end faces of the disk part of the hollow valve preformed blank to gradually make the disk part of the hollow valve preformed blank fully fill the hollow valve disk part forming inner cavity 212 under pressure. The disk part of the hollow valve manufactured therefrom has an inner cavity with an outline consistent with the external outline of the forging member 222 of the impacting and pressing part 22, and has an outer outline consistent with the outline of the hollow valve disk part forming inner cavity 212.

To guarantee that the manufactured hollow valve is more reasonable in the overall streamline distribution, more dense in structure and capable of further meeting the manufacturing requirements, preferably, a relation between a radius $R1$ of the arced concave face of the neck part of each hollow valve preformed blank 5 and a radius $R0$ of a cavity face of the disk part concave face forming cavity 212c in the die-forging forming mold 2 meets $R1=1.05 \times R0$; and a relation between a radius $R2$ of an arced concave face of the disk part of the manufactured hollow valve 6 and a radius $R0$ of a cavity face of the disk part concave face forming cavity 212c in the die-forging forming mold 2 meets $R2=R0$. A relation among an included angle $\theta1$ between a frustoconical face of an outer periphery of the neck part of each hollow valve preformed blank 5 and an axis thereof, an included angle $\theta2$ between the frustoconical face of the outer periphery of the neck part of the manufactured hollow valve 6 and an axis thereof, and an included angle $\theta0$ between a frustoconical face of the hollow valve neck part forming inner cavity 213 in the die-forging forming mold 2 and an axis thereof meets $\theta1=\theta12=\theta0$.

The technology of embodiments of the present invention are further illustrated with reference to an example.

For example, for a hollow valve of a certain model, a blank is symmetrically machined with the method of embodiments of the present invention, thus forming at specific positions of the blank a spherical concave platform (i.e. an arced concave face formed on an outer peripheral face of the blank at such position), a conical platform (i.e. a frustoconical lateral face formed on an outer peripheral face of the blank at such position), and a cylinder (i.e. a cylindrical face formed on an outer peripheral face of the blank at such position).

(1) Roll to acquire hollow valve preformed blanks.

For example, a steel tube with a specification of Φ12×6 mm is selected and discharged in terms of size, and the length of a blank is 100 mm. A high-frequency heating furnace is used to heat the blank to 1150° C., and a material pushing device pushes the blank into the cross wedge rolling mold on a cross wedge rolling machine. The cross wedge rolling preformed blank formed through rolling has a cone angle of a conical platform being 4°, a maximal excircle diameter being 9.5 mm, and an outside diameter of a spherical platform being 7 mm. A rolled piece is cut from the middle to obtain two hollow valve preformed blanks.

(2) Forge to realize the precision forming of the disk part of the hollow valve preformed blank.

One of the hollow valve preformed blanks rolled by the cross wedge rolling mold is heated and then placed into the die-forging forming mold for forging and forming the disk part.

By employing the cross wedge rolling and die-forging precision forming process provided by embodiments of the present invention for such kind of hollow valve, 20% of materials are saved for the blank used in terms of size, compared with that of the preformed blank subjected to cross wedge rolling in terms of the maximal excircle diameter of the stem part, and the procedure of roughly turning a conical body of the stem part is omitted. The die-forging forming mold is reliable in positioning by making use of the frustoconical lateral face for positioning.

Compared with the prior art, in the precision forming method of the high-efficiency and near-net hollow valve blank of the engine of embodiments of the present invention, the precision performing is realized by the cross wedge rolling mold, under the rolling of which the metal tubing for the valve deforms, with a middle part sunken and two ends elongating. The middle part forms the stem part of the hollow valve; the two ends form the disk parts to be machined; and the connection sections between the disk parts and the stem part form the neck parts (the outer peripheral face consisting of the arced concave face and the frustoconical lateral face), thereby meeting the manufacturing requirements at the cross wedge rolling phase of the metal tubing for the valve, achieving better consistency among the acquired hollow valve blanks in terms of shape and size, avoiding such a situation that the revolving face of the stem part is obtained by the subsequent rough machining manner, and effectively improving the production efficiency and the material utilization rate. After the rolling is completed, the disk part of each acquired hollow valve preformed blank is machined by the die-forging forming mold that is matched with the disk structure of the manufactured hollow valve, and the hollow valve preformed blank is directly placed in the cavities of the die-forging forming mold for forging, so that the manufactured hollow valve is reasonable in the overall streamline distribution of the stem part, the neck part and the disk part. The hollow valve is dense in structure, and meets the performance requirements. With the metal tubing for the valve serving as the blank to perform the rolling and forging, there is no need to hollow the valve in a drilling manner, thereby effectively preventing material waste, and achieving the advantages of low rejection rate, high material-saving rate, high forming precision, high production rate and the like.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A precision forming method of a high-efficiency and near-net hollow valve blank of an engine, comprising:
   Step 1: manufacturing a cross wedge rolling mold and a die-forging forming mold;
   Step 2: heating a metal tubing for a valve to a rolling temperature;
   Step 3: rolling the metal tubing for the valve that is heated to the rolling temperature by the cross wedge rolling mold to make the metal tubing for the valve change in outside diameter and elongate along an axial direction thereof to form a eudipleural hollow valve blank, wherein a symmetric line for the eudipleural hollow valve blank is vertical to an axis thereof, and the hollow valve blank has a middle part as a stem part and two ends as disk parts, and connection sections between the stem part and the disk parts as neck parts of the hollow valve blank;
   Step 4: segmenting the hollow valve blank along the symmetric line of the hollow valve blank to form a first hollow valve preformed blank and a second hollow valve preformed blank, both of which are the same in structure, where each of the first hollow valve preformed blank and the second hollow valve preformed blank consists of a stem part, a neck part and a disk part, all of which are continuously connected in sequence; and
   Step 5: forging the first hollow valve preformed blank or the second hollow valve preformed blank by the die-forging forming mold to shape the disk part of the first hollow valve preformed blank or second hollow valve preformed blank into the disk part of the hollow valve, thereby manufacturing the hollow valve;
   wherein, the die-forging forming mold includes a mold body and an impacting and pressing component, both of which are disposed separately; and
   the mold body is internally provided with an impacting inner cavity, a hollow valve disk part forming inner cavity, a hollow valve neck part forming inner cavity and a hollow valve stem part placing inner cavity, all of which are disposed on top of one another and communicated continuously and are collinear in axis; the hollow valve disk part forming inner cavity consists of a disk excircle forming cavity, a disk conical face forming cavity and a disk concave face forming cavity, all of which are disposed on top of one another and are continuous, wherein the disk excircle forming cavity is used for forming a disk excircle of the disk part of the hollow valve, the disk conical face forming cavity is used for forming a disk conical face of the disk part of the hollow valve, and the disk concave face forming cavity is used for forming an arced concave face of the disk part of the hollow valve; an outline of the hollow valve neck part forming inner cavity is consistent with an external outline of the neck part of the hollow valve blank; and an outline of the hollow valve stem part placing inner cavity is consistent with an external outline of the stem part of the hollow valve blank; and a top end face of the impacting and pressing component is a stamping bearing plane for bearing an external stamping force, the middle of a bottom end face of the impacting and pressing component is provided with a forging member capable of stretching into an inner cavity of each hollow valve preformed blank and applying the stamping force to the disk part of the hollow valve preformed blank; and an outer peripheral face of the forging member is formed by combining a frustoconical lateral face, an arced concave face and a cylindrical face, all of which are disposed on top of one another and are collinear in axis and continuous.

2. The precision forming method of a high-efficiency and near-net hollow valve blank of an engine according to claim 1, wherein the outer peripheral face of the neck part of the hollow valve blank is formed by mutually connecting the continuous frustoconical lateral face and the arced concave face.

3. The precision forming method of a high-efficiency and near-net hollow valve blank of an engine according to claim 2, wherein a relation between a radius R1 of an arced concave face of the neck part of each hollow valve preformed blank and a radius R0 of a cavity face of the disk part concave face forming cavity in the die-forging forming mold meets R1=1.05×R0; and a relation between a radius R2 of the arced concave face of the disk part of the hollow valve and the radius R0 meets R2=R0.

4. The precision forming method of a high-efficiency and near-net hollow valve blank of an engine according to claim 1, wherein the cross wedge rolling mold includes a wedging part, a spreading part and a finishing part; the cross wedge rolling mold has a forming angle of 35° to 38°, a spreading angle of 4° to 6° of the welding part, and a spreading angle of 3° to 5° of the spreading part.

5. The precision forming method of a high-efficiency and near-net hollow valve blank of an engine according to claim 1, wherein, in Step 3, the cross wedge rolling mold rolls the metal tubing for the valve that is heated to the rolling temperature under a disengagement condition.

6. The precision forming method of a high-efficiency and near-net hollow valve blank of an engine according to claim 1, characterized in that wherein, in Step 5, the forging is implemented by using a residual rolling heat of the first hollow valve preformed blank or the second hollow valve preformed blank; or before the forging, the first hollow valve preformed blank or the second hollow valve preformed blank is heated.

7. The precision forming method of a high-efficiency and near-net hollow valve blank of an engine according to claim 1, characterized in that wherein, in Step 1, the corresponding cross wedge rolling mold and die-forging forming mold are manufactured according to specifications of the hollow valve to be manufactured as required.

8. The precision forming method of a high-efficiency and near-net hollow valve blank of an engine according to claim 1, characterized in that wherein, in Step 2, a heating furnace is used to heat the metal tubing for the valve, with the metal tubing for the valve being a steel tubing; and in Step 3, the cross wedge rolling mold is installed in a cross wedge rolling machine, and a material pushing device is used to push the metal tubing for the valve heated to the rolling temperature into the cross wedge rolling machine, thereby implementing the rolling of the metal tubing for the valve heated to the rolling temperature by the cross wedge rolling mode.

9. The precision forming method of a high-efficiency and near-net hollow valve blank of an engine according to claim 1, wherein, the rolling temperature is 1000° C. to 1200° C.

* * * * *